(12) United States Patent
Lennen et al.

(10) Patent No.: US 8,151,170 B2
(45) Date of Patent: Apr. 3, 2012

(54) SYSTEM AND METHOD FOR ENHANCED DATA DECODE IN A GPS RECEIVER

(75) Inventors: Gary Lennen, Cupertino, CA (US);
William Kerry Keal, Santa Clara, CA (US)

(73) Assignee: Sirf Technology, Inc., San Jose, CA (US)

( * ) Notice: Subject to any disclaimer, the term of this patent is extended or adjusted under 35 U.S.C. 154(b) by 791 days.

(21) Appl. No.: 12/326,717

(22) Filed: Dec. 2, 2008

(65) Prior Publication Data

US 2010/0134349 A1 Jun. 3, 2010

(51) Int. Cl.
*H03M 13/13* (2006.01)
*G01S 19/13* (2010.01)

(52) U.S. Cl. .......................... 714/777; 342/357.66
(58) Field of Classification Search ........... 714/777; 342/357.66
See application file for complete search history.

(56) References Cited

U.S. PATENT DOCUMENTS

| | | | | |
|---|---|---|---|---|
| 6,018,818 A * | 1/2000 | Sheynblat | ............ | 714/811 |
| 6,292,748 B1 * | 9/2001 | Harrison | ............ | 701/213 |
| 6,775,802 B2 * | 8/2004 | Gaal | ............ | 714/758 |
| 6,816,710 B2 * | 11/2004 | Krasner | ............ | 455/73 |
| 7,026,987 B2 * | 4/2006 | Lokshin et al. | ............ | 342/357.28 |
| 7,191,385 B2 * | 3/2007 | Olaker | ............ | 714/780 |
| 7,269,511 B2 * | 9/2007 | Underbrink et al. | ............ | 701/213 |
| 7,545,317 B2 * | 6/2009 | Han | ............ | 342/357.64 |
| 7,701,391 B2 * | 4/2010 | Curry et al. | ............ | 342/357.42 |
| 7,720,104 B2 * | 5/2010 | Rao | ............ | 370/498 |
| 7,847,726 B2 * | 12/2010 | Jia et al. | ............ | 342/357.31 |
| 7,903,028 B2 * | 3/2011 | Wang et al. | ............ | 342/357.77 |
| 7,924,947 B2 * | 4/2011 | Tapucu et al. | ............ | 375/340 |

* cited by examiner

Primary Examiner — Stephen Baker
(74) Attorney, Agent, or Firm — Haynes and Boone, LLP

(57) ABSTRACT

Systems and methods are disclosed herein for improving the sensitivity of satellite data decode in a satellite navigation receiver. The low signal ephemeris data decoding system of the present disclosure achieves a 5 db improvement in decoding sensitivity over conventional system by operating down to a CN0 of 21 dB-Hz. The improved sensitivity is achieved through a combination of reducing the number of data bits to be decoded, overcoming the inherent differential decoding problem of an all data bit polarity inversion, improving the probability of seeing single bit decoding error in an ephemeris word, running the parity correction algorithm, and reducing the undetected word error rate. The improved sensitivity makes it possible to predict the orbit of the satellite and to determine the receiver's location with higher accuracy even when operating in challenging signal conditions.

28 Claims, 3 Drawing Sheets

SYSTEM AND METHOD FOR ENHANCED DATA DECODE IN A GPS RECEIVER

TECHNICAL FIELD

The present disclosure relates generally to a system and a method for improving the sensitivity of satellite data decode in a satellite navigation receiver. Specifically, the present disclosure relates to a system and a method to more reliably demodulate and decode GPS ephemeris data from a satellite in low satellite signal conditions down to a CN0 of 21 dB-Hz.

BACKGROUND

Satellite-based positioning systems include constellations of earth orbiting satellites that constantly transmit orbit information and ranging signals to receivers. An example of a satellite-based positioning system is the Global Positioning System (GPS), which includes constellations of earth orbiting satellites, also referred to as GPS satellites. The GPS satellites transmit precise orbit information and ranging signals which are received by GPS receivers. The GPS receiver receives the satellite signal information from three or more GPS satellites and calculates its location by measuring the range of the receiver from the satellites and by determining the locations of the satellites. Location of a satellite is derived from ephemeris and almanac data transmitted by the satellite. The almanac data tells the GPS receiver where each GPS satellite of the constellation should be at any time over a wide time interval that spans a few days or weeks. The ephemeris data of each GPS satellite tells the GPS receiver with much more accuracy the specific location of the satellite over a much shorter period of time. For example, the ephemeris data of a GPS satellite predicts the satellite position, in addition to its velocity, clock bias, and clock drift over a future interval of approximately four hours. Therefore, correct demodulation and decoding of the ephemeris data are essential for determining the position of the receiver.

However, there are situations when a low signal strength of the satellite signals can prevent the correct demodulation or decoding of the ephemeris data. Low signal strength conditions can occur in challenging environments such as in urban canyons, under foliage, inside tunnels etc. Signal strength is typically expressed as a ratio of carrier power over noise power, or CN0, in units of dB-Hz. For example, conventional GPS data decode systems have not proven to be capable of operating reliably below a CN0 of 26 dB-Hz. In particular, the problem of undetected bit errors becomes severe when operating below the CN0 of 26 dB-Hz. GPS data bits are organized into GPS data word of 30 bits long. An undetected bit error occurs when a data decode system indicates a successful data word decode when in fact there are bits in the word that are wrong. Undetected bit errors in an ephemeris data decode can lead to large position errors. Under low signal strength conditions, the CN0 may drop below the minimum threshold of 26 dB-Hz required for conventional GPS data decode systems to operate reliably. Therefore, it is desirable to improve the sensitivity of ephemeris data decoding and to reduce the probability of undetected bit error in order to enable correct position determination of the GPS receiver when operating in low signal conditions.

BRIEF SUMMARY

Systems and methods are disclosed herein to reliably demodulate and decode ephemeris data from a GPS satellite in low signal strength conditions. Benefits include a 95% success rate in decoding GPS ephemeris data given two frames of data at a CN0 of 23 dB-Hz. Each frame of data consists of 50 GPS data words of which the GPS ephemeris data is encapsulated in 19 words. A reduced probability of successful ephemeris decoding is achievable down to a CN0 of 21 dB-Hz. At the lower CN0, more than two frames of data can be used to improve the probability of successful decoding. Thus, up to 5 db improvement in the sensitivity of ephemeris data decoding can be obtained over conventional system. In addition, the probability of undetected bit error in an ephemeris data word can be reduced to $2 \times 10^{-8}$ at a CN0 of 23 dB-Hz.

In accordance with one or more embodiments of the present disclosure, a low signal ephemeris data decoding system includes an ephemeris data bit prediction subsystem, a CN0 measurement subsystem, a data inversion prevention algorithm (DIPA) subsystem, a data parity check and correction subsystem, and a frame combination subsystem. The ephemeris data bit prediction subsystem predicts the data bits in the ephemeris data word to initialize the DIPA. The CN0 measurement subsystem determines if the DIPA subsystem, the data correction subsystem, and the frame combination subsystem are invoked for low signal strength conditions. The DIPA subsystem prevents data phase inversion associated with differential data decoding. The data parity check and correction subsystem checks for error in the GPS data words and is also capable of correcting single bit error in a 32 bit extended GPS word. The frame combination subsystem compares the equivalent GPS words between two frames to reduce the undetected bit errors.

In accordance with one or more embodiments of the present disclosure, the ephemeris data bit prediction subsystem applies an extended ephemeris algorithm to predict ephemeris data in the GPS data frame to help reduce the number of bits that have to be estimated. The DIPA subsystem is initialized with the predicted bits such that the differential decoding is only run on unknown data bits, between segments of predicted bits. The DIPA subsystem also determines phase change between a current bit and a number of previous bits to reduce the probability that a single phase error may lead to subsequent bit polarity inversion and to improve the probability of seeing only single bit errors. These improvements enable the application of the data parity check and correction subsystem to correct single bit error from a data word such as a (32, 26) Hamming code word of an extended GPS word. Additionally, in low signal conditions the frame combination subsystem may compare the equivalent GPS words from more than two frames to improve performance by reducing the undetected bit errors.

These and other embodiments of the present disclosure will be more fully understood by reference to the following detailed description when considered in conjunction with the following drawings.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Systems and methods are disclosed herein to reliably demodulate and decode ephemeris data from a GPS satellite down to a CN0 of 23 dB-Hz. GPS data is organized into a GPS data frame of 50 words. Each data frame is further divided into 5 subframes of 10 words each. The GPS ephemeris data is encapsulated in 19 words of the 50 words data frame and consists of 3 words in subframe 1, 8 words in subframe 2, and 8 words in subframe 3. The ephemeris data is continuously transmitted by each satellite at the GPS data rate of 50 bits per second. Simulations with one or more embodiments of the present disclosure have shown a 95% probability of successfully decoding all bits in the 19 ephemeris data words of a GPS frame given two frames of data at a CN0 of 23 dB-Hz. It is assumed that the ephemeris data does not change for the two frames of data used for data decode. The probability of successful decoding can also be characterized in terms of word error rate (WER), detected word error rate or undetected word error rate (UWER). Word error rate is defined as the probability that an ephemeris data word is received in error. It is the sum of the detected word error rate and the UWER. Detected word error rate is defined as the probability of an ephemeris data word being detected as an error. UWER is defined as the probability of the system indicating a successful decoding of an ephemeris word when in fact there are bits in the word that are wrong. As mentioned, in a conventional ephemeris data decoding system, a high rate of UWER due to severe undetected bit errors has prevented the system from operating below a CN0 of 26 dB-Hz. It is desirable to achieve a 95% probability of successful ephemeris data decoding for the 19 ephemeris data words in a GPS frame, together with a UWER of less than $10^{-6}$. This low UWER is desirable in practice to reduce the probability that a user will experience a large position error due to UWER. Simulations with one or more embodiments of the present disclosure have shown a 95% probability of successful ephemeris decoding of a GPS frame with an UWER of $2 \times 10^{-8}$ at a CN0 of 23 dB-Hz. For CN0 in the range of 21 dB-Hz to 23 dB-Hz the probability of successful ephemeris decoding is reduced due to a higher UWER. However, at the lower CN0 more than two frames of data may be used to improve the UWER and thus the success rate.

Figure 1:
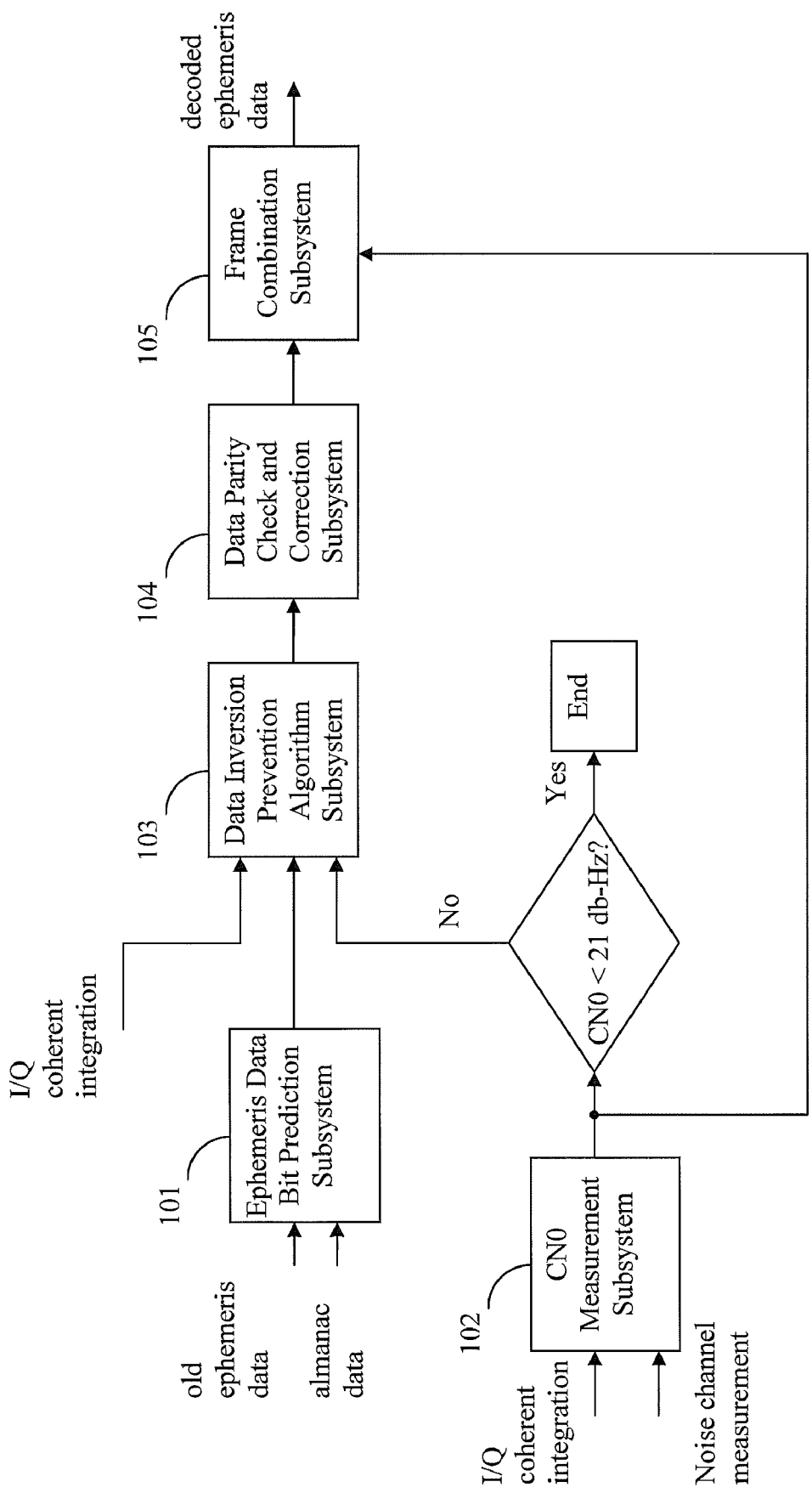
FIG. 1 shows a top level block diagram of a low signal ephemeris data decoding system according to one or more embodiments of the present disclosure.

FIG. 1 shows a top level block diagram of a low signal ephemeris data decoding system according to one or more embodiments of the present disclosure. The decoding system includes an ephemeris data bit prediction subsystem 101, a CN0 measurement subsystem 102, an data inversion prevention algorithm (DIPA) subsystem 103, a data parity check and correction subsystem 104, and a frame combination subsystem 105. The DIPA subsystem 103, the data parity check and correction subsystem 104 and the ephemeris data bit prediction subsystem 101 are used to improve the basic WER performance. The ephemeris data bit prediction subsystem 101 is also used to initialize the DIPA subsystem 103. The frame combination subsystem 105 is used to improve the UWER that is severe at low CN0. The CN0 measurement subsystem 102 determines if the CN0 falls below a first minimum threshold where the UWER becomes too high for the low signal ephemeris data decoding system to operate successfully. Below this minimum threshold, which is determined to be 21 dB-Hz in one embodiment of the present disclosure, the DIPA subsystem 103, the data parity check and correction subsystem 104, and the frame combination subsystem 105 are disabled. The CN0 measurement 102 also determines if the CN0 is below a second threshold, determined to be 23 dB-Hz in one embodiment of the present disclosure, so that more than two frames of data may be used by the frame combination subsystem 105 to improve the UWER and the rate of successful ephemeris data decoding.

The ephemeris data bit prediction subsystem 101 predicts data bits in the 19 ephemeris data words of the GPS data frame. These include bits that are known (preambles at the beginning of the subframes, '00' bits at the ends of words 2 and 10 of the subframes), and bits predicted through an orbital propagation prediction algorithm using older ephemeris data and almanac data. Ephemeris data from a GPS satellite contain information to predict the satellite's state over a future interval of approximately four hours. For example, the ephemeris data describes a Keplerian element ellipse with additional corrections that allow the satellite's position to be calculated in an Earth-centered, Earth-fixed (ECEF) set of rectangular coordinates at any time over the four hour validity period. Conventionally, new ephemeris data have to be collected when the validity time for the previously collected ephemeris data has expired. However, decoding performance may be improved by reducing the number of ephemeris data bits to be decoded. The orbital propagation prediction algorithm of the ephemeris data prediction subsystem 101 applies an extended ephemeris algorithm to predict bits of the ephemeris data beyond the typical four hours validity period in order to reduce the number of bits to be decoded.

Figure 2:
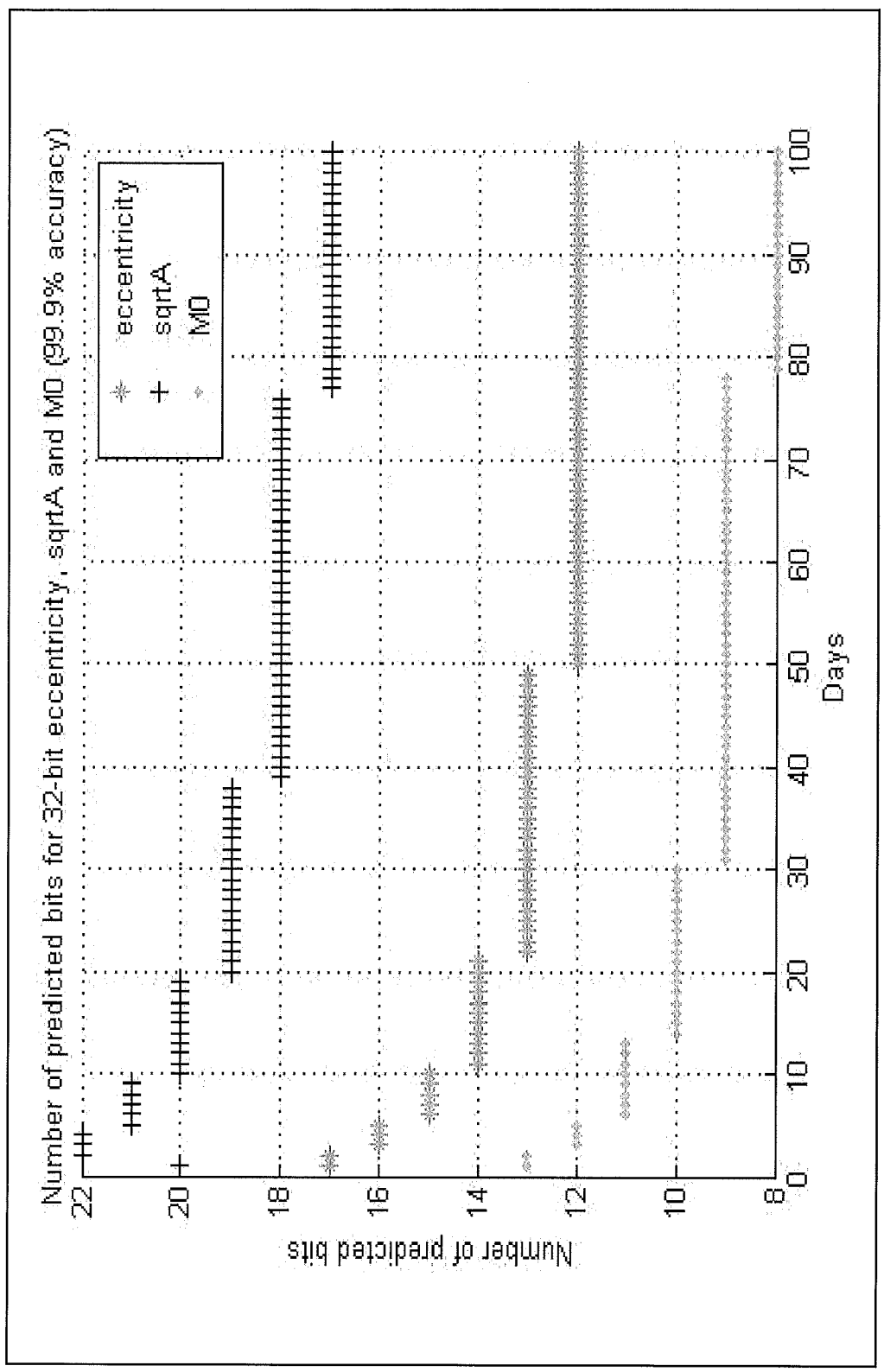
FIG. 2 shows the number of bits of a 32-bit eccentricity parameter, a square root of A parameter, and a $M_0$ parameter of the ephemeris data words that can be predicted by an ephemeris data bit prediction subsystem with greater than 99.9% accuracy as a function of the number of days since a last known satellite position according to one or more embodiments of the present invention.

As orbit prediction is related to the time since a last known satellite position, it is expected that the accuracy of the prediction will degrade and thus the number of bits that may be predicted will reduce with increasing time from the last known satellite position. FIG. 2 shows the number of bits of a 32-bit eccentricity parameter, a square root of A parameter, and a $M_0$ parameters of the ephemeris data words that can be predicted by the ephemeris data bit prediction subsystem with greater than 99.9% accuracy as a function of the number of days since a last known satellite position according to one or more embodiments of the present invention. From FIG. 2, it is seen that up to 22 bits of the 32-bit square root of A parameter may be predicted with a 99.9% accuracy within a few days of the last known satellite position. The number of predicted bits gradually decline over time. However, even after 100 days, 15 bits of the 32-bits may still be predicted with a 99.9% accuracy. Knowledge of the predicted bits reduces the number of bits to be estimated by subsequent processing and thus helps to improve WER and UWER performance.

The orbital propagation prediction algorithm predicts current ephemeris data or current satellite states through numerical integration of GPS satellite equations of motion using appropriate force models. The force models used consist of the Earth gravity, a model of the gravitational effects of the Moon and the Sun, typically denoted as a luni-solar model, Earth orientation transformations, solar radiation pressure and yaw-bias (y-bias) models. A compact series expression of the parameters for these models may be obtained through curve fitting to both past and future data. A numerical integration method such as a Runta-Kutta method numerically integrates GPS satellite equations of motion using the calculated parameters to predict current satellite states. The satellite states may then be formatted into predicted ephemeris.

Additional details of the ephemeris data bit prediction subsystem are described in a U.S. patent application Ser. No. 11/555,074 filed on Oct. 31, 2006 (publication number US 2008/0129593 A1), the specification of which is incorporated herein by reference in its entirety.

Referring back to FIG. 1, the CN0 measurement subsystem 102 measures the CN0 to determine if the low level data decode system of the present disclosure is to be run. A conventional data decode system may use a phase tracking loop such as a narrowband Costas loop or a frequency tracking loop such as an AFC with differential data decode to decode data. As mentioned, the conventional data decode systems can not operate reliably below a CN0 of 26 dB-Hz due to the resulting high rate of UWER. For example, the minimum data decoding sensitivity of the narrowband Costas loop is at a CN0 of 26 dB-Hz and the minimum data decoding sensitivity of the AFC with differential decode is even higher at a CN0 of 28 dB-Hz. Using the low level data decoding system of the present disclosure to decode ephemeris data improves the decoding sensitivity by about 5 dB while maintaining an acceptable UWER performance. However, below a minimum sensitivity CN0 of 21 dB-Hz the UWER also becomes too high for the low signal ephemeris data decoding system to operate reliably. The CN0 measurement subsystem 102 detects when the CN0 drops below this minimum sensitivity level so that the DIPA subsystem 103, the data parity check and correction subsystem 104, and the frame combination subsystem 105 may be disabled. The CN0 measurement subsystem 102 may also detect when the CN0 is below 23 dB-Hz so that more than two frames of data may be used by the frame combination subsystem 105 to improve the UWER and the rate of successful ephemeris data decoding.

The CN0 measurement subsystem 102 computes the CN0 across the 32 bits of an extended GPS word consisting of the 30 bits of the current word plus two bits of the previous 30 bit word used to compute parity. CN0 is computed independently for each extended 32 bit word. Therefore, at a GPS data rate of 50 bits per second, the CN0 is computed for a period of 32×20 mSec=640 mSec. Computing CN0 across the extended 32 bit word helps to ensure that the CN0 is only computed for the data word to be decoded and that a fast fading signal may be filtered out.

There are two CN0 computations. The first is a basic CN0 computation that yields the measurement in dB-Hz. The second gives a decision of whether the measured CN0 is equal to or greater than a desired CN0 with a desired probability. The first computation may be useful when it is desirable to know the CN0. The second computation may be useful when it is desirable to know whether the CN0 exceeds a given threshold.

The basic CN0 computation calculates the mean of the magnitude of I/Q coherent integration values of a 20 mSec data bit over the 32 bits of the extended GPS word. The I/Q coherent integration values are generated by the correlator. The mean value of the signal magnitude is computed as:

$$M_{signal} = (\Sigma_{j=1\ldots 32} sqrt(I_{j,20\,mSec}^2 + Q_{j,20\,mSec}^2))/32 \quad \text{(Eq. 1)}$$

where j is an index for the 32 bits of the extended word, $I_{j,20}$ and $Q_{j,20}$ are the 20 mSec I/Q coherent integration values for the $j^{th}$ bit from the correlator, and sqrt is a square root function that computes the magnitude as the square root of the sum of the squares of $I_{j,20}$ and $Q_{j,20}$.

The CN0 measurement is given by:

$$CN0_{word} = 20\log_{10}(M_{signal}/M_{noise}) + 17 \quad \text{(Eq. 2)}$$

Where $CN0_{word}$ is in units of dB-Hz and $M_{noise}$ is the noise channel measurement scaled to a 20 mSec period.

Simulations show that at a lower CN0 (<25 dB-Hz) the computed $CN0_{word}$ diverges from the actual CN0 value due to the noise statistics inherent in the 20 mSec I/Q coherent integration values used to compute the signal magnitude. Therefore, a correction term may have to be applied to the $CN0_{word}$ at lower CN0 to yield a more accurate measurement. Alternatively, the second computation may be used to guarantee with a high confidence that the CN0 is greater than or equal to a selected CN0 value. In this computation, the $CN0_{word}$ is compared against a threshold to determine if the CN0 is greater than or equal to a desired CN0 value with a desired probability. The threshold is selected through simulation for the desired CN0 and the desired probability. For example, the threshold for detecting a CN0 of 23 dB-Hz with a probability of 0.999 is determined through simulation to be 2.45 and is compared against the computed $CN0_{word}$ to decide whether to use more than two frames of data in the frame combination subsystem 105 to improve the UWER.

Figure 3:
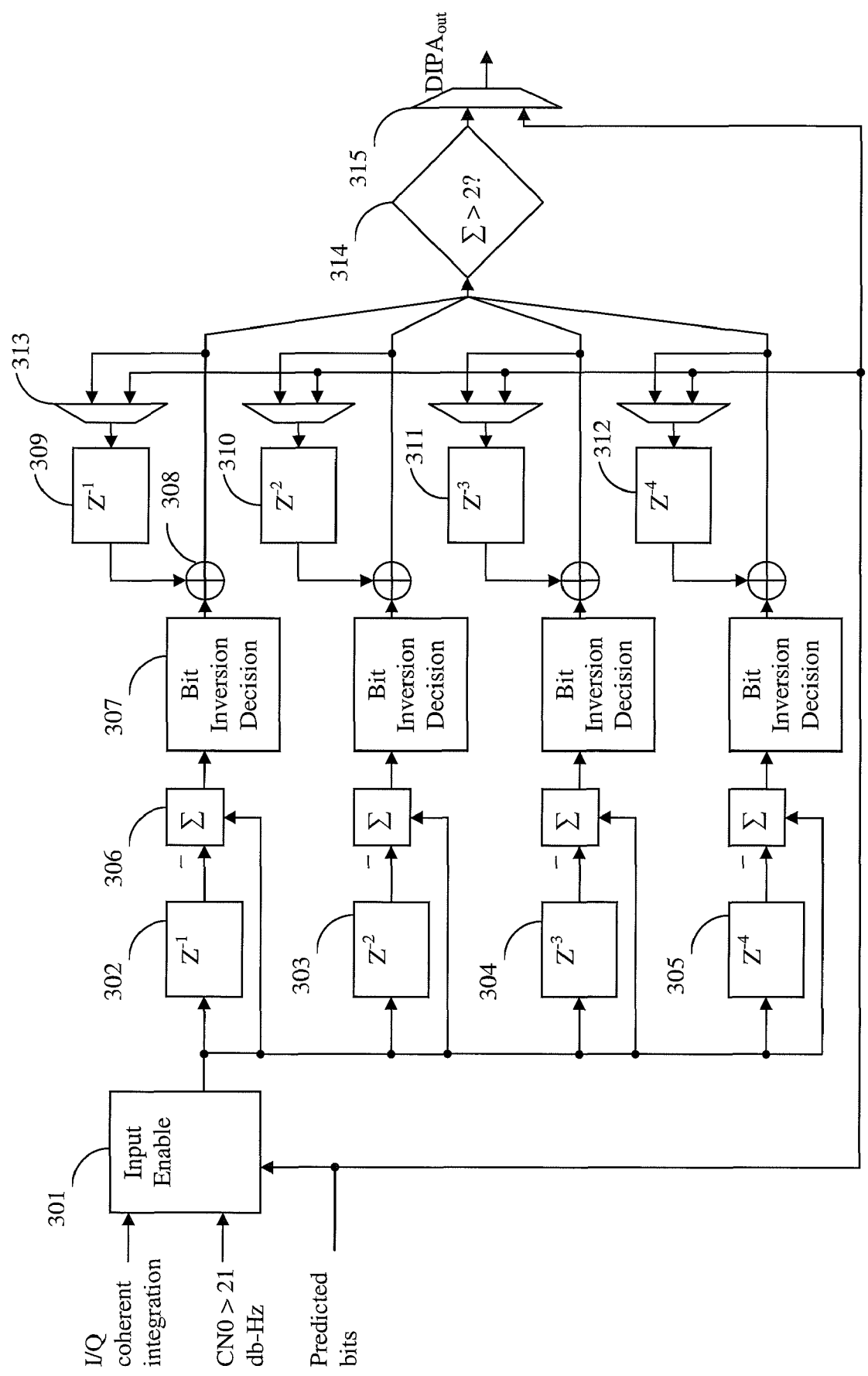
FIG. 3 shows a block diagram of a data inversion prevention algorithm (DIPA) subsystem according to one or more embodiments of the present disclosure.

FIG. 3 shows a block diagram of the (DIPA) subsystem 103 according to one or more embodiments of the present disclosure. The DIPA subsystem 103 performs the demodulation and decoding of the ephemeris data bits. As mentioned, the low signal ephemeris data decoding system of the present disclosure may operate below the minimum sensitivity level of a conventional phase tracking loop such as a narrowband Costas loop. Therefore, it is assumed that there is no phase tracking and that a form of differential data decoding is used. Conventional differential decoding of differentially encoded data may be implemented with a finite impulse response (FIR) filter that uses the phase change between consecutive symbols to demodulate and decode the data bits that map the symbols. However, a binary phase shift keying (BPSK) modulated GPS data stream is not differentially encoded. Therefore, differential decoding with a GPS data stream uses a last known data bit or a last decoded bit along with the phase change between consecutive bits to demodulate and decode the data bits. Because a previous decoded bit may be used in the differential decoding, the decoder behaves as an infinite impulse response (IIR) filter where a decoded bit error may invert all subsequent data bit decoding. This leads to a large bit error rate (BER) and a large WER. The DIPA subsystem 103 implements two features to reduce this large decoding error. The first feature is to use the predicted bits from ephemeris data bit prediction subsystem 101 to initialize the DIPA subsystem 103 such that the differential decoding is only run on unknown data bits, between segments of known bits. The second feature is to determine the phase change between a current bit and a number of previous phase values to improve decoding performance. In essence, it takes a majority vote on whether a polarity change has occurred between the current bit and a number of previous bits. This reduces the probability that a single phase error may lead to subsequent bit errors. Therefore, the DIPA subsystem 103 is designed to overcome the inherent differential decoding problem of an all data bit polarity inversion. This improves the chance of seeing single bit errors, which the data parity check and correction subsystem 104 is effective at correcting.

Referring to FIG. 3, a DIPA subsystem consists of an input enable unit 301, input phase delay registers 302-305, differential phase units 306, bit inversion decision units 307, exclusive-or units 308, output bit delay registers 309-312, initialization muxes 313, a majority vote unit 314, and a decoded output mux 315. The DIPA subsystem takes as inputs the I/Q coherent integration from the correlator, a CN0>21 dB-Hz indicator bit from the CN0 measurement subsystem 102, and the predicted bits from the ephemeris data bit prediction subsystem 101. The output of the DIPA subsystem is the DIPA$_{out}$ to the data parity check and correction subsystem 104. A differential phase decoder performs the differential decoding and consists of one of the input phase delay registers 302-305, a differential phase unit 306, a bit inversion decision unit 307, an exclusive-or unit 308, one of the output bit delay registers 309-312, and an initialization mux 313. FIG. 3 is shown with four differential phase decoders to determine the phase change between the current bit and four previous bits. However, other number of differential phase decoders is possible.

The input enable unit 301 enables inputs to the DIPA subsystem only when the CN0 exceeds the minimum sensitivity level of 21 dB-Hz as indicated by the CN0>21 dB-Hz indicator bit. The input enable unit 301 may also control the DIPA subsystem so that it only operates on the phase value inputs corresponding to the unknown data bits, between the predicted bits. Alternatively, the DIPA subsystem may operate on all phase value inputs corresponding to either the unknown or predicted data bits. However, the differentially decoded bits corresponding to the predicted data bits may be discarded and replaced by the predicted bits at the output through the decoded output mux 315. In either case, the predicted bits are used to initialize the DIPA subsystem by loading the output bit delay registers 309-312 with the predicted bits through the initialization muxes 313. Initialization of the DIPA subsystem with the predicted bits helps to improve the WER and UWER performance as fewer bits have to be decoded.

The phase value input for each bit is represented by the I/Q coherent integration input which is the I/Q coherent integration value over each 20 ms bit period from the correlator. The I/Q phase value for the current bit is compared against the I/Q phase value of the previous bit stored in the input phase delay register 302 using the differential phase unit 306. The differential phase unit 306 calculates the phase difference between the previous bit and the current bit. Similarly, the I/Q phase value for the current bit is compared against the I/Q phase value corresponding to a bit that is two bits prior to the current bit. The I/Q phase value for this older bit is stored in the input phase delay register 303, which stores the I/Q phase values for the previous two bits. The differential phase calculation is also repeated for the current bit and bits that are three and four bits prior to the current bit. The I/Q phase value for the bit that is three bits prior to the current bit is stored in the phase delay register 304, which stores the I/Q phase values for the previous three bits. Similarly, The I/Q phase value for the bit that is four bits prior to the current bit is stored in the phase delay register 305, which stores the I/Q phase values for the previous four bits. The I/Q phase value for the current bit is also shifted into all four input phase delay registers 302-305 so that it may be used as an older I/Q phase value for the differential phase calculation of future bits. Alternatively, since the phase delay register 305 stores the I/Q phase values for the previous four bits, it may provide all four older I/Q phase values to the differential phase units 306 of the four differential phase decoders. The differential phase unit 306 may be implemented as a difference of the arc tangent of the I/Q phase values of the current bit and the older bit. Alternatively, it may be implemented as a dot product of the current bit and the older bit.

The bit inversion decision unit 307 looks at the phase change from the differential phase unit 306 and determines whether there is a bit inversion. For example, the decision boundaries for the bit inversion decision unit 307 may be chosen such that if the phase change is greater than $3\pi/2$ and less than or equal to $\pi/2$ then there is no bit inversion. Otherwise, if the phase change is greater than $\pi/2$ and less than or equal to $3\pi/2$ then there is a bit inversion. There are four bit inversion decision units 307 operating on the phase differences between the current bit and the four previous bits to generate four bit inversion decisions. If there is a bit inversion the prior decoded or predicted bit is inverted using the exclusive-or unit 308. Specifically, the output from the bit inversion decision unit 307 is exclusive-or'ed with either a previously decoded bit or a predicted bit as stored in the output bit delay registers 309-312. Each of the four output bit delay registers 309-312 outputs a previously decoded or predicted bit that is 1, 2, 3, and 4 bits prior to the currently decoded bit, respectively. For example, the bit inversion decision output derived from the phase difference between the current and the previous bit of the first differential phase decoder is exclusive-or'ed with the decoded or predicted bit that is previous to the current bit as stored in the output bit delay register 309. Similarly, the bit inversion decision output derived from the phase difference between the current bit and the bit that is two bits prior to the current bit of the second differential phase decoder is exclusive-or'ed with the decoded or predicted bit that is two bits prior to the current bit as stored in the output bit delay register 310. This is repeated for the other two differential phase decoders working on the phase differences between the current bit and the bit that is three and four bits prior to the current bit. The output from the exclusive-or unit 308 then represents the hypothesized decoder output from the differential phase decoder. Thus, there are four hypothesized decoder outputs representing the decoded phase change between the current bit and four different previous bits. The hypothesized decoder outputs from the four differential phase decoders are summed by the majority vote unit 314. The majority vote unit 314 makes a determination based on the summation whether the decoded bit is more likely to be a '1' or a '0.' For example, the majority vote unit 314 may decode a '1' only when the summation of the four hypothesized decoder outputs exceeds a majority threshold of 2. The hypothesized decoder outputs are also shifted into the output bit delay registers 309-312 to be used as the prior decoded bits to be inverted by future bit inversion decision outputs. Because the four differential phase decoders calculate four phase differences between the current bit and four different prior bits to generate four hypothesized decoder outputs, any single phase error is less likely to lead to future bit errors. Thus, the probability of an all data bit polarity inversion is reduced. Simulations have shown that using the DIPA across 32 bits of an unknown data segment improves the WER by about 2 dB.

The DIPA subsystem 103 uses knowledge of the predicted bits from the ephemeris data bit prediction subsystem 101 for initialization. The DIPA subsystem may also be initialized with known bits through a partial network assist of ephemeris data such as provided by a cellular base station. In addition, the embodiment of the DIPA subsystem as shown in FIG. 3 shows the DIPA operating in a forward time direction by decoding phase change between current bit and prior bits. However, the DIPA subsystem may also work in a backward time direction by decoding phase change between current bit and future bits. Allowing the DIPA subsystem to work both forward and backward in time from predicted data segments effectively reduces the number of data bits the DIPA subsystem has to span by a factor of two.

Referring back to FIG. 1, the decoded bits from the DIPA subsystem 103 are run through the data parity check and correction subsystem 104. The data parity check and correction subsystem 104 operates on a 32 bit extended GPS word. Each 32 bit extended GPS word represents a (32, 26) Hamming code word consisting of 26 data bits (24 information bearing bits of the current word and the last two bits of the parity bits from the previous word) and 6 parity bits generated by a (26, 6) parity generation matrix for the (32, 26) Hamming code. The 32 bit extended word is initially run through a parity check algorithm by matrix multiplying the 32 bit extended word against the transpose of a (6, 32) parity check matrix for the (32, 26) Hamming code to generate a 6 bit syndrome vector. The parity check algorithm is capable of detecting all combinations of bit errors up to 3 bits and some combinations of more bits. Parity check is declared successful when the summation of the 6 bits of the syndrome vector is 0 in binary arithmetic. If this is the case, the 32 bit extended GPS word is output to the frame combination subsystem 105 and a parity pass is indicated. Otherwise, the parity check fails and the parity correction algorithm is run to try to correct for bit error. The parity correction algorithm for the (32, 26) Hamming code is capable of correcting a single bit error in the 32 bit extended word. In conventional GPS receivers, the parity correction algorithm is not normally run for two reasons. The first reason is that running parity correction leads to very poor probability of UWER. The second reason is that a single bit correction algorithm is not useful for correcting the all data bit polarity inversion inherent in conventional differential decoders. These limitations have been overcome by the data decoding system of the present disclosure. First, the poor UWER statistics from running the parity correction algorithm may be improved by using the frame combination subsystem 105 to compare the equivalent GPS words between two frames. Additionally, as mentioned, using the DIPA subsystem 103 reduces the probability of the all data bit polarity inversion. It also improves the probability of seeing single bit error, which the single bit correction algorithm is effective at correcting. Therefore, the combination of the DIPA subsystem 103 and the frame combination subsystem 105 allows the use of the parity correction algorithm to improve WER probability without degrading UWER statistics.

The parity correction algorithm for the (32, 26) Hamming code is run by comparing the 6 bit syndrome vector against all 32 column vectors of the (6, 32) parity check matrix. If there is no match between the 6 bit syndrome vector and any of the column vectors in the (6, 32) parity check matrix then there is more than one bit in error and the errors are not correctable. A parity fail indication is output to indicate a word decoding error. If there is a match, the single error bit position is indicated by the column index of the matching column vector in the (6, 32) parity check matrix. The bit in the 32 bit extended word corresponding to this error bit position is then inverted to generate the corrected word. Parity check is run again on the corrected word by matrix multiplying the corrected word against the transpose of the (6, 32) parity check matrix to generate a new 6 bit syndrome vector. If the summation of the 6 bits of the new syndrome vector is 0 in binary arithmetic then the parity correction algorithm has successfully corrected the single bit error. The corrected word is output to the frame combination subsystem 105 and a parity pass is indicated. Otherwise, the corrected bit is not the right bit because there is more than one bit in error and the errors are not correctable. A parity fail indication is output to indicate a word decoding error.

The (6, 32) parity check matrix for the (32, 26) Hamming code in GPS is:

(10111011000111110011010010100000)
(01011101100011111001101001010000)
(10101110110001111100110100001000)
(01010111011000111110011010000100)
(00101011101100011111001101000010)
(11001011011110101000100111000001)

where the (6, 26) sub-matrix consisting of the first 26 column vectors of the (6, 32) parity check matrix is the transpose of the (26, 6) parity generation matrix used to generate the parity bits.

The frame combination subsystem 105 compares the equivalent ephemeris words between multiple frames to reduce the UWER arising from the parity correction algorithm of the data parity check and correction subsystem 104. The frame combination subsystem 105 augments the single frame decoding of a conventional data decoding system. Only the ephemeris word with a successful parity check from the data parity check and correction subsystem 104 is processed by the frame combination subsystem 105. When a 32 bit extended word with a successful parity check is received from the parity correction algorithm its 24 bit information bearing bits are compared with the 24 bits from the equivalent word of another frame. The 19 ephemeris words from the two frames are assumed to be identical. If there is any discrepancy in the 24 bits between the two equivalent words of the two frames then one of the two equivalent words has error bit(s) that went undetected by the parity check. The two equivalent words are declared as having word decoding errors and dropped from further consideration. Therefore, by performing the equivalent word comparison for all 19 ephemeris words from the two frames UWER is significantly improved at a slight degradation in WER performance. Simulations have shown an UWER of $2 \times 10^{-8}$ and a 95% probability of successful ephemeris data decoding given two frames of data at a CN0 of 23 dB-Hz. At a lower CN0 more than two frames of ephemeris data may be used to improve the UWER. For example, when the CN0 is below 23 dB-Hz as indicated by the CN0 measurement subsystem 102, equivalent words from three frames of ephemeris data may be compared. If the equivalent words from any two of the three frames do not match then word decoding errors may be declared. Therefore, the higher UWER of the lower CN0 is reduced by requiring a match between equivalents words from all three frames. Alternatively, the probability of successful decoding for multiple frames can be improved and essentially traded for a slightly worse UWER by only requiring that any two words taken from greater than two frames need to agree. Conversely, at a higher CN0 when the UWER is low enough the frame combination subsystem 105 may be bypassed altogether so that only a single frame decoding is required. The 19 ephemeris words of a frame that have passed the comparison are output from the frame combination subsystem 105 as the decoded ephemeris data for use by a navigation processor to calculate the satellite orbit and a navigation solution.

Therefore, the low signal ephemeris data decoding system of the present disclosure achieves a 5 db improvement in decoding sensitivity over conventional system by operating down to a CN0 of 21 dB-Hz. The improved sensitivity is achieved through a combination of reducing the number of data bits to be decoded, overcoming the inherent differential decoding problem of an all data bit polarity inversion, improving the probability of seeing single bit decoding error in an ephemeris word, running the parity correction algorithm, and reducing UWER. The improved sensitivity makes it possible to predict the orbit of the satellite and to determine the receiver's location with higher accuracy even when operating in challenging signal conditions.

Although embodiments of the present disclosure have been described, these embodiments illustrate but do not limit the disclosure. It should also be understood that embodiments of the present disclosure should not be limited to these embodiments but that numerous modifications and variations may be made by one of ordinary skill in the art in accordance with the principles of the present disclosure and be included within the spirit and scope of the present disclosure as hereinafter claimed.

We claim:

1. A data decoding system for a satellite-based navigation system comprising:
    a data prediction subsystem adapted to provide predicted data bits for a satellite;
    a differential data decoding subsystem adapted to provide decoded data bits from the satellite for data bits other than the predicted data bits;
    a data parity check and correction subsystem adapted to perform parity check and to correct bit errors in the decoded data bits from the differential data decoding subsystem and the predicted data bits from the data prediction subsystem to provide equivalent data words for a plurality of frames; and
    a frame combination subsystem adapted to compare the equivalent data words for the plurality of frames to provide a decoded data word.

2. The data decoding system of claim 1, wherein the data prediction subsystem provides the predicted data bits for GPS ephemeris data by using older ephemeris data and almanac data of a GPS satellite.

3. The data decoding system of claim 1, wherein the data prediction subsystem is a network transmitting the predicted data bits to assist data decoding systems within the network.

4. The data decoding system of claim 1, wherein the data parity check and correction subsystem operates on a (32, 26) Hamming code word of an extended GPS word where the 26 data bits of the (32, 26) Hamming code word comprises 24 information bearing bits and 2 last parity bits of a previous (32, 26) Hamming code word.

5. The data decoding system of claim 4, wherein each of the equivalent data words for the plurality of frames from the data parity check and correction subsystem is a GPS data word comprising the 24 information bearing bits and the 6 parity bits of the (32, 26) Hamming code word.

6. The data decoding system of claim 1, wherein the frame combination subsystem compares a data word from the equivalent data words for the plurality of frames only if the data word has a successful parity check from the data parity check and correction subsystem.

7. The data decoding system of claim 6, wherein the frame combination subsystem provides a decoded data word if the equivalent data words for the plurality of frames match.

8. The data decoding system of claim 1, further comprising a CN0 measurement subsystem adapted to measure a signal strength of the satellite.

9. The data decoding system of claim 8, wherein if the signal strength of the satellite measured by the CN0 measurement subsystem is below a threshold the differential data decoding subsystem, the data parity check and correction subsystem, and the frame combination subsystem are disabled.

10. The data decoding system of claim 8, wherein the signal strength is measured over 32 bits of an extended GPS word comprising of 30 bits of a GPS word and last 2 bits of a previous GPS word.

11. The data decoding system of claim 8, wherein if the signal strength of the satellite measured by the CN0 measurement subsystem is below a threshold the frame combination subsystem compares the equivalent data words for more than two frames.

12. The data decoding system of claim 1, wherein the differential data decoding subsystem comprises:
    a plurality of differential phase decoders adapted to provide a plurality of hypothesized decoder outputs; and
    a majority vote unit adapted to provide the decoded data bits from the satellite based on the plurality of hypothesized decoder outputs.

13. The data decoding system of claim 12, wherein each of the plurality of differential phase decoders further comprises:
    a differential phase unit adapted to provide a phase difference between a phase of a data bit to be decoded and a phase of a surrounding bit separated by a bit distance from the data bit to be decoded;
    a bit inversion decision unit adapted to provide a bit inversion decision based on the phase difference; and
    an exclusive-or unit adapted to provide the hypothesized decoder output by inverting a previous decoder output separated from the hypothesized decoder output by the bit distance in the differential phase unit based on the bit inversion decision.

14. The data decoding system of claim 13, wherein for the differential phase decoder the data bit to be decoded is not one of the predicted data bits from the data prediction subsystem.

15. The data decoding system of claim 13, wherein for the differential phase decoder the previously decoded output is initialized with one of the predicted bits from the data prediction subsystem.

16. The data decoding system of claim 12, wherein the majority vote unit adds the plurality of hypothesized decoder outputs to generate a summation.

17. The data decoding system of claim 16, wherein the majority vote unit compares the summation against a majority threshold to provide a bit of the decoded data bits.

18. A method of decoding data bits from satellites of a satellite-based navigation system, comprising:
    predicting data bits for the satellites to form predicted data bits;
    reducing number of data bits to be decoded by using the predicted data bits;
    performing a plurality of differential phase decoding between a data bit to be decoded and a plurality of data bits surrounding the data bit to be decoded to form a decoded data bit;
    performing data parity checking and error correction on a data word comprising a plurality of predicted data bits and a plurality of decoded data bits to form equivalent parity checked and corrected data words for a plurality of frames;
    comparing the equivalent parity checked and corrected data words for the plurality of frames to form a decoded data word.

19. The method of claim 18, wherein said predicting data bits for GPS satellites comprises predicting GPS ephemeris data by using older ephemeris data and almanac data.

20. The method of claim 18, wherein said predicting data bits for the satellites comprises receiving the predicted data bits from a network.

21. The method of claim 18, wherein said performing data parity checking and error correction comprises operating on a (32, 26) Hamming code word of an extended GPS word where the 26 data bits of the (32, 26) Hamming code word comprises 24 information bearing bits and 2 last parity bits of a previous (32, 26) Hamming code word.

22. The method of claim 18, further comprising measuring signal strength to form a CN0 measurement.

23. The method of claim 22, further comprising disabling performing the plurality of differential phase decoding if the CN0 measurement is below a threshold.

24. The method of claim 22, wherein said comparing the equivalent parity checked and corrected data words for the plurality of frames comprises comparing equivalent parity checked and corrected data words for more than two frames if the CN0 measurement is below a threshold.

25. The method of claim 18, wherein performing each of the plurality of differential phase decoding comprises:
   calculating a phase difference between a phase of the data bit to be decoded and a phase of a surrounding data bit where the surrounding data bit is separated from the data bit to be decoded by a bit distance;
   comparing the phase difference to decision boundaries to form a bit inversion decision; and
   inverting a previous decoded data bit separated from the data bit to be decoded by the bit distance used in calculating the phase difference based on the bit inversion decision to form a hypothesized decoded data bit.

26. The method of claim 25, wherein performing the plurality of differential phase decoding further comprises:
   adding the hypothesized decoded data bit from each of the plurality of differential phase decoding to form a sum; and
   comparing the sum against a majority threshold to form the decoded data bit.

27. The method of claim 25, wherein said reducing the number of data bits to be decoded by using the predicted data bits comprises initializing the previous decoded data bit with one of the predicted data bits.

28. A data decoding system for a satellite-based navigation system comprising:
   a data prediction subsystem adapted to provide predicted data bits for a satellite;
   a differential data decoding subsystem adapted to provide decoded data bits from the satellite for data bits other than the predicted data bits; and
   a data parity check and correction subsystem adapted to perform parity check and to correct bit errors in the decoded data bits from the differential data decoding subsystem and the predicted data bits from the data prediction subsystem to provide a decoded data word for a frame.

* * * * *